(12) United States Patent
Wang et al.

(10) Patent No.: US 6,292,285 B1
(45) Date of Patent: Sep. 18, 2001

(54) SINGLE ROTATING POLYGON MIRROR WITH V-SHAPED FACETS FOR A MULTIPLE BEAM ROS

(75) Inventors: Mark Shi Wang, Irvine; Vinod Mirchandani, Agoura, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,573

(22) Filed: Dec. 20, 1999

(51) Int. Cl.[7] .................................................. G02B 26/08
(52) U.S. Cl. ........................ 359/204; 359/203; 359/216; 347/243
(58) Field of Search ..................................... 359/201, 203, 359/204, 205, 206, 212, 213, 214, 215, 216, 217, 218, 223; 347/233, 241, 243

(56) References Cited

U.S. PATENT DOCUMENTS

| | | | |
|---|---|---|---|
| 3,758,187 | 9/1973 | Thomas et al. | 350/3.5 |
| 5,268,565 | 12/1993 | Katoh et al. | 359/212 |
| 5,359,407 | 10/1994 | Suzuki et al. | 359/203 |
| 5,828,483 | 10/1998 | Schwartz et al. | 359/216 |
| 5,861,977 | 1/1999 | Harrigan et al. | 359/203 |

*Primary Examiner*—Cassandra Spyrou
*Assistant Examiner*—Euncha Cherry
(74) *Attorney, Agent, or Firm*—William Propp (57) ABSTRACT

A single rotating polygon mirror with v-shaped facets having upper and lower reflective facet surfaces reflects and separates dual beams to two photoreceptors in a ROS. Each facet surface will have a different tilt angle. The two independently modulated beams will share common optical elements between the light sources and the mirror and may share a common f-theta scan lens. Two sets of two beams can be incident upon the facets on opposite sides of the rotating polygon mirror. The polygon mirror facet can also have three or four reflective facet surfaces to reflect and separate three or four independently modulated beams to three or four different photoreceptors.

20 Claims, 7 Drawing Sheets

SINGLE ROTATING POLYGON MIRROR WITH V-SHAPED FACETS FOR A MULTIPLE BEAM ROS

BACKGROUND OF THE INVENTION

The present invention relates to a single common rotating polygon mirror in a multiple beam raster output scanning (ROS) system and, more particularly, to a single rotating polygon mirror with v-shaped facets having upper and lower reflective facet surfaces to reflect and separate multiple beams to multiple photoreceptors.

Printing systems utilizing lasers to reproduce information are well known in the art. The printer typically uses a Raster Output Scanner (ROS) to expose the charged portions of the photoreceptor to record an electrostatic latent image thereon. Generally, a ROS has a laser for generating a collimated beam of monochromatic radiation. This laser beam is modulated in conformance with image information. The modulated beam is transmitted through a lens onto a scanning element, typically a rotating polygon having mirrored facets.

The light beam is reflected from a facet and thereafter focused to a "spot" on the photosensitive medium. The rotation of the polygon causes the spot to scan across the photoreceptor in a fast scan (i.e. line scan) direction. Meanwhile, the photoreceptor is advanced relatively more slowly than the rate of the fast scan in a slow scan (process) direction which is orthogonal to the fast scan direction. In this way, the beam scans the photoreceptor recording medium in a raster scanning pattern. The light beam is intensity-modulated in accordance with an input image information serial data stream so that individual picture elements ("pixels") of the image represented by the data stream are exposed on the photoreceptor to form a latent image, which is then transferred to an appropriate image receiving medium such as paper. Laser printers may operate in either a single pass or a multiple pass system.

In a single pass, process color system, three ROS systems are positioned adjacent to a photoreceptor surface and selectively energized to create successive image exposures, one for each of the three basic colors. A fourth ROS system may be added if black images are to be created as well. In a multiple pass system, each image area on the photosensitive medium must make at least three passes relative to the scan line formed by the modulated laser beam generated by a single ROS system.

Problems with these color printing systems include the high cost related to the use of multiple ROSs, the high cost of producing nearly identical multiple ROSs and associated optics, and the difficulty of aligning or registering the system colors.

Traditionally, a single beam ROS has a single light source which emits a single modulated light beam which is reflected from the facets of the rotating polygon mirror to scan a single line on a single photoreceptor. Three or four ROS systems are used to provide color printing.

A multiple beam ROS has either a single light source which emits two or more different modulated light beams or multiple light sources which emit multiple different modulated light beams. These multiple beams are collimated by the same single collimated lens and then focused by the same single cylindrical lens onto the facets of a single rotating polygon mirror. After reflecting from the facet, the multiple beams pass through f-theta scan lenses and motion compensating optical elements to scan multiple lines on a single photoreceptor.

One successful way to increase the photoreceptor speed is to employ multiple or "multispot" diode lasers. A multispot diode laser is a single device that has a plurality of closely spaced semiconductor lasers. The use of multispot diode lasers enables two or more independently addressable laser beams to be modulated together, thereby increasing the number of scan lines that are discharged across the photoreceptor during a single sweep.

A laser scanner patent to Harrigan et al. (U.S. Pat. No. 5,861,977) proposed a rotating polygon mirror tower with a first polygon mirror having a small diameter and a smaller number of facets underneath a second polygon mirror having a large diameter and a larger number of facets. A single set of optic elements are provided in the scanner for the pre-polygon collimating and focusing and for the post-polygon f-theta scan lenses and motion compensating optics. The single light beam can be shifted from the first polygon mirror to the second polygon mirror to adjust the size and resolution of the resulting single scanning beam on the single photoreceptor.

Typically, the facets of the polygon mirror are uniform in shape and uniform in tilt angle relative to the axis of rotation. Any minute differences in size and angle from facet to facet are treated as "wobble" or "bow" errors in the ROS to be corrected by lens and mirrors before the light beam is scanned across the photoreceptor.

However, a ROS is needed for multiple beams which uses a single common optics but scans modulated beams across multiple photoreceptors.

It is an object of this invention to provide a single rotating polygon mirror with vshaped facets having upper and lower reflective facet surfaces to direct multiple scanning beams to multiple photoreceptors in a raster output scanning (ROS) system.

SUMMARY OF THE INVENTION

According to the present invention, a single rotating polygon mirror with v-shaped facets having upper and lower reflective facet surfaces reflects and separates dual beams to two photoreceptors in a ROS. Each facet surface will have a different tilt angle. The two independently modulated beams will share common optical elements between the light sources and the mirror and may share a common f-theta scan lens. Two sets of two beams can be incident upon the facets on opposite sides of the rotating polygon mirror. The polygon mirror facet can also have three or four reflective facet surfaces to reflect and separate three or four independently modulated beams to three or four different photoreceptors.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
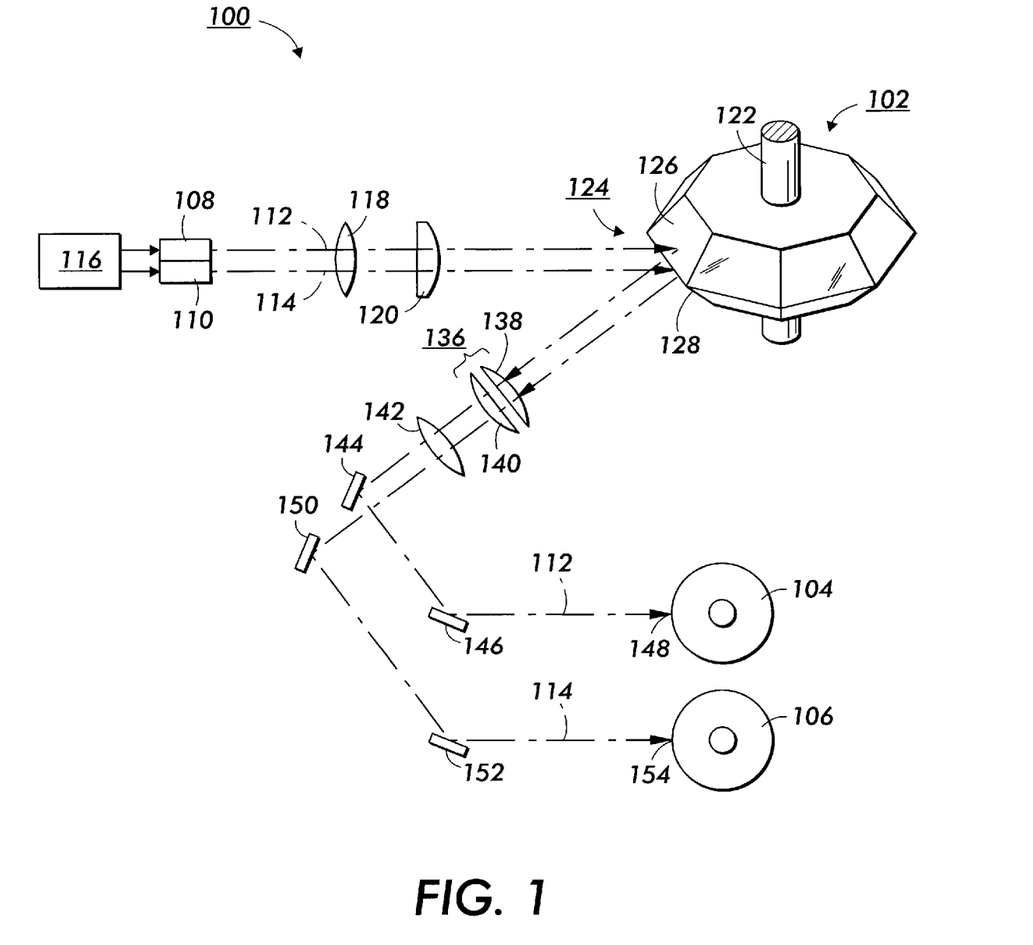
FIG. 1 illustrates a side view of the raster output scanning (ROS) system with a single rotating polygon mirror with v-shaped facets having upper and lower reflective surfaces to reflect the two beams to two photoreceptors of the present invention.

Reference is now made to FIG. 1, wherein there is illustrated a raster output scanning (ROS) system 100 with a single rotating polygon mirror 102 with v-shaped facets having upper and lower reflective surfaces to reflect and separate the two scanning beams to a first photoreceptor 104 and a second photoreceptor 106 as an embodiment of the present invention.

A pair of light sources, 108 and 110, emit two modulated coherent light beams 112 and 114.

The first light source, 108, such as a laser diode, emits a first modulated coherent light beam 112 of a single wavelength. The first light beam 112 is modulated in conformance with the information contained in the first video signal sent from image output control circuit 116 to the first light source 108.

The second light source, 110, such as a laser diode, emits a second modulated coherent light beam 114 of a single wavelength. The second light beam 114 is modulated in conformance with the information contained in the second video signal sent from image output control circuit 116 to the second light source 110.

The first and second modulated light beams are emitted parallel to each other and closely spaced so that the two beams will pass through the same optical elements. The first and second light beams can be independently modulated. The first and second light beams can have different wavelengths since each will be focussed individually.

The first and second modulated light beams 112 and 114 are collimated by a collimating lens 118.

The first and second collimated modulated light beam 112 and 114 are focused by a cylindrical lens 120 onto the facets of the rotating polygon mirror 102.

The two beams 112 and 114 are closely spaced so that the beams can share the common optics of the single collimating lens 118 and the single focusing lens 120.

Figure 2:
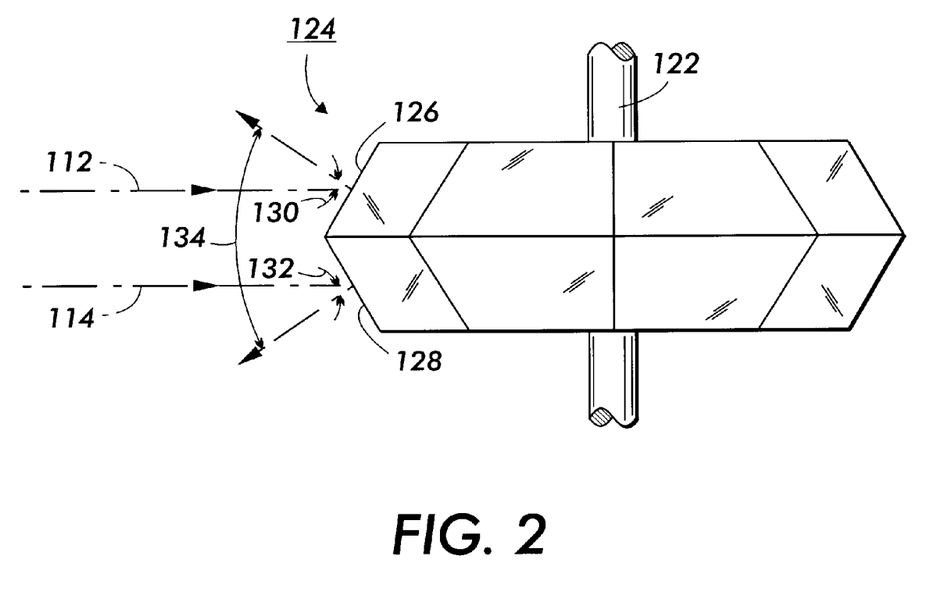
FIG. 2 illustrates a side view of the rotating polygon mirror with v-shaped facets having upper an lower reflective surfaces of FIG. 1.

As best seen in FIG. 2, the polygon mirror 102 of the present invention rotates around an axis of rotation 122 by a conventional motor (not shown), known to those of ordinary skill in the art. The polygon mirror 102 has a series of V-shaped reflective facets 124, each facet having an upper facet surface 126 and a lower facet surface 128. This polygon could have any number of facets, while for this application, the rotating polygon has eight distinct facets.

Rather than having the plane of each surface of the facet parallel to the axis of rotation 122, the facet surfaces 126 and 128 are each tilted at an angle to the axis of rotation 122 denoted as the "tilt angle", sometimes referred to as the "draft angle". The first facet surface 126 will have a first tilt angle 130 while the second facet surface 128 will have a second tilt angle 132. The first tilt angle 130 is different from the second tilt angle 132. Typical tilt angles can range from 0.5 to 5 degrees if the beams are to share optical elements. The tilt angles can be greater than 10 degrees if the beams have separate optical elements. The tilt angles 130 and 132 are shown exaggerated in the Figures for ease of understanding.

The first modulated light beam 112 is typically perpendicular to the axis of rotation 122. The first modulated light beam is incident at an angle of incidence of 0.5 to 5 degrees to the first facet surface 126 of the facet 124. The light strikes the facet and is reflected off with the normal angle of incidence equaling the angle reflection. The first modulated light beam 112 will reflect from the upper first facet surface 126 at the first tilt angle 130.

The second modulated light beam 114 will reflect from the lower second facet surface 128 at the second tilt angle 132. The second modulated light beam is incident at an angle of incidence of 0.5 to 5 degrees to the second facet surface 128 of the facet 124. The light strikes the facet and is reflected off with the normal angle of incidence equaling the angle reflection. The second modulated light beam 114 will reflect from the lower second facet surface 128 at the second tilt angle 132.

The first facet surface 126 and the second facet surface 128 are flat mirror surfaces with no optical power.

The two reflected modulated light beams 112 and 114 will have an angular separation 134 of 1 to 10 degrees equivalent to the combination of the first tilt angle 130 and the second tilt angle 132.

Returning to FIG. 1, the first modulated light beam 112 is reflected from the first facet surface 126 and the second modulated beam 114 is reflected from the second facet surface 128 of the facet 124 of the rotating polygon mirror 102.

The two beams 112 and 114 then pass through a f-theta scan lenses 136 consisting of a negative plano-spherical lens 138 and a positive plano-spherical lens 140. This f-theta scan lenses configuration has sufficient barrel distortion to produce linear scan beams which then passes through a cylindrical lens 142.

The cylindrical lens will flatten the field curvature of each of the beams from the f-theta lenses while the f-theta scan lenses together with the cylinder lens produces a linear, flat-field scan beam. The f-theta lenses are designed with the cylindrical lens because the cylindrical lens may contribute a small, but non-negligible, amount of distortion, especially at large scan angles.

The angular beam separation 134 is small enough so that the two beams 112 and 114 can pass through the same single f-theta scan lenses 136.

A first fold mirror 144 (sometimes referred to as a "pick-off" mirror) will reflect the first reflected modulated beam 112 from the f-theta scan lenses 136 and cylindrical lens 142 to the first motion compensating optical (MCO) element 146, which is a wobble correction mirror in this embodiment. The MCO element can consist of a cylindrical mirror or a cylindrical lens. The MCO element helps correct for wobble of the rotating polygon mirror 102.

The first motion compensating optical (MCO) element 146 will also focus the first reflected modulated beam 112 onto a scan line 148 on the first photoreceptor 104.

A second fold mirror 150 will reflect the second reflected modulated beam 114 from the f-theta scan lenses 136 and cylindrical lens 142 to the second motion compensating optical (MCO) element 152, which is a wobble correction mirror in this embodiment. This MCO element can also consist of a toroidal surface in the f-theta lenses, a cylindrical mirror or a cylindrical lens. This MCO element also helps correct for wobble of the rotating polygon mirror 102.

The second motion compensating optical (MCO) element 152 will also focus the second reflected modulated beam 114 onto a scan line 154 on the second photoreceptor 106.

The first light beam 112 is independently modulated in conformance with the information contained in the first video signal sent from image output control circuit 116 to the first light source 108. The image output control circuit 116 contains the circuit and logic modules which respond to the input video data signals to modulate the first light beam 112. The image output control circuit 116 also contains the other control and timing signals to control the rotation of the polygon mirror by the motor (not shown) and operate the first photoreceptor drive (not shown) so that the first modulated light beam 112 incident and reflected by the first upper facet surface 126 of the facet 122 of the polygon mirror 102 as the first reflected modulated beam 112 contains the appropriate signal information for the scan line on the first photoreceptor 104.

Similarly, the second light beam 114 is independently modulated in conformance with the information contained in the second video signal sent from image output control circuit 116 to the second light source 110. The image output control circuit 116 contains the circuit and logic modules which respond to the input video data signals to modulate the second light beam 114. The image output control circuit 116 also contains the other control and timing signals to control the rotation of the polygon mirror by the motor (not shown) and operate the second photoreceptor drive (not shown) so that the second modulated light beam 114 incident and reflected by the second lower facet surface 128 of the facet 122 of the polygon mirror 102 as the second reflected modulated beam 114 contains the appropriate signal information for the scan line on the second photoreceptor 106.

As opposed to internal modulation within the light source, the light beam can be modulated by any suitable external acousto-optic or electro-optical modulator. The light beam will be emitted from the light source as an unmodulated coherent beam and then directed to the external modulator which will modulate the beam in conformance with the information contained in the video signal sent from the image output control circuit to the modulator.

Figure 3:
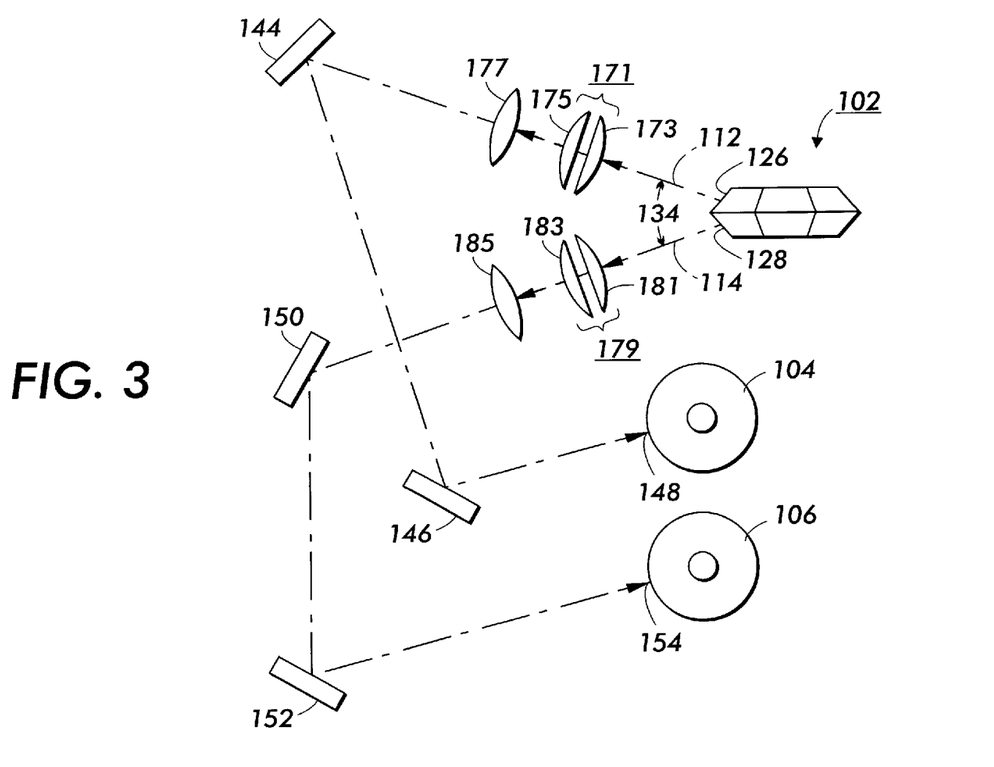
FIG. 3 illustrates the side view of the rotating polygon mirror with v-shaped facets having upper and lower reflective surfaces of FIG. 1 with sufficient angular beam separation for separate f-theta scan lenses.

As shown in the alternate embodiment of FIG. 3, the angular beam separation 134 between the two beams 112 and 114 after reflection from the facet surfaces 126 and 128 can be sufficiently wide enough, typically greater than 10 degrees, and there can a sufficient distance between the optical elements of the rotating polygon mirror and the f-theta scan lenses so that the two beams can have separate f-theta scan lenses in addition to separate MCO elements.

The first modulated light beam 112 is reflected from the first facet surface 126 and the second modulated beam 114 is reflected from the second facet surface 128 of the facet 124 of the rotating polygon mirror 102.

The first beam 112 will then pass through a first f-theta scan lenses 171 consisting of a first negative plano-spherical lens 173 and a first positive plano-spherical lens 175. This f-theta scan lenses configuration has sufficient barrel distortion to produce a linear scan beam which then passes through a first cylindrical lens 177.

A first fold mirror 144 (which may not be necessary if the angular separation 134 or optical element separation is sufficiently large) will reflect the first reflected modulated beam 112 from the first f-theta scan lenses 171 and cylindrical lens 177 to the first motion compensating optical (MCO) element 146, which is a wobble correction mirror in this embodiment. The first motion compensating optical (MCO) element 146 will also focus the first reflected modulated beam 112 onto a scan line 148 on the first photoreceptor 104.

Similarly, the second modulated beam 114 is reflected from the second facet surface 128 of the facet 124 of the rotating polygon mirror 102.

The second beam 114 will then pass through a second f-theta scan lenses 179 consisting of a second negative plano-spherical lens 181 and a second positive plano-spherical lens 183. This f-theta scan lenses configuration has sufficient barrel distortion to produce a linear scan beam which then passes through a second cylindrical lens 185.

A second fold mirror 150 (which may not be necessary if the angular separation 132 or optical element separation is sufficiently large) will reflect the second reflected modulated beam 114 from the f-theta scan lenses 179 and cylindrical lens 185 to the second motion compensating optical (MCO) element 152, which is a wobble correction mirror in this embodiment. The second motion compensating optical (MCO) element 152 will also focus the second reflected modulated beam 114 onto a scan line 154 on the second photoreceptor 106.

Figure 4:
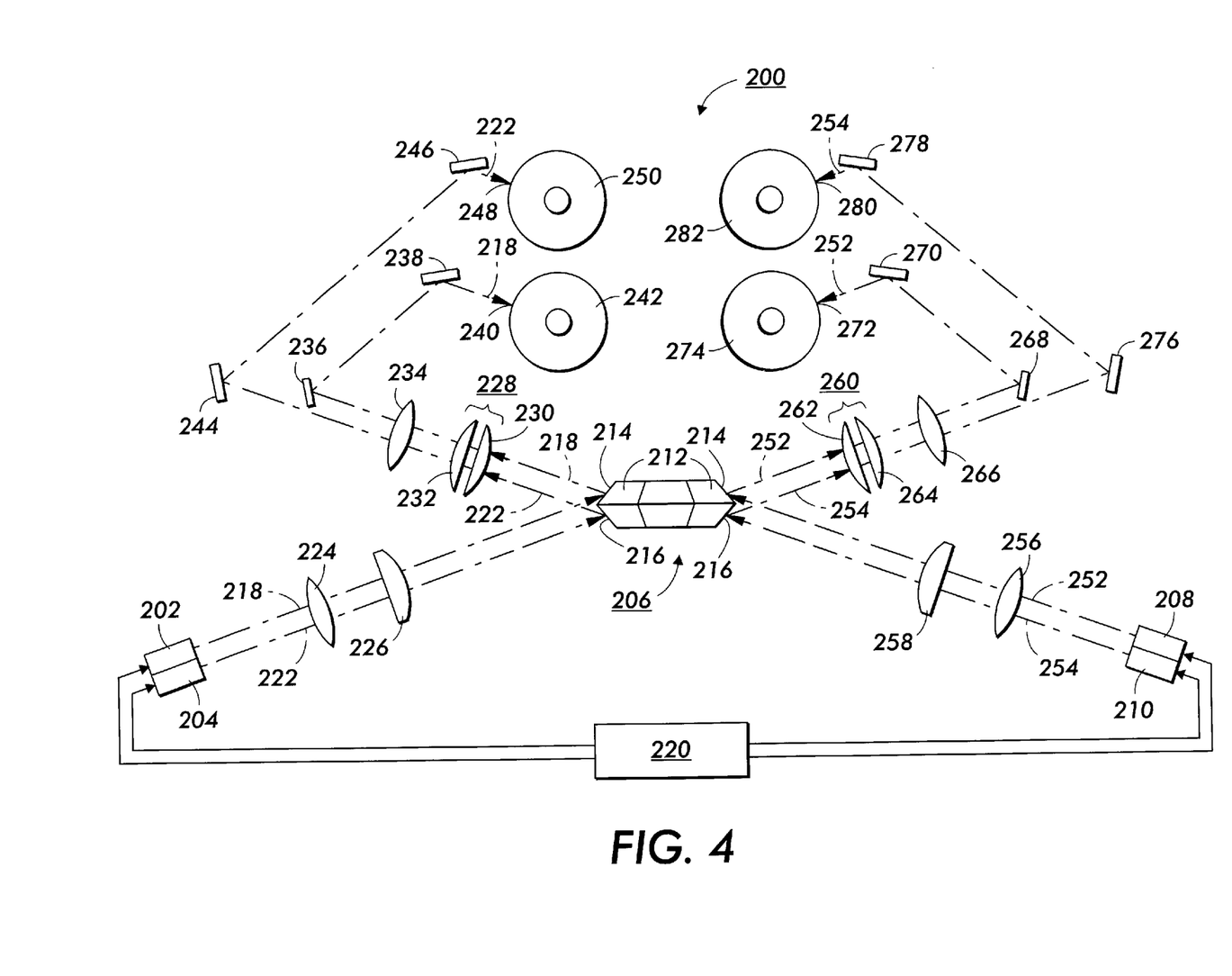
FIG. 4 illustrates a side view of an alternate embodiment of the raster output scanning ROS) system with a single rotating polygon mirror with v-shaped facets having upper and lower reflective surfaces to reflect the two beams on one side of the polygon mirror to two photoreceptors and to direct two other beams on the other side of the mirror to two more photoreceptors of the present invention.

As shown in the embodiment of FIG. 4, the raster output scanning system 200 has a first light source 202 and a second light source 204 on opposite sides of the single rotating polygon mirror 206 from a third light source 208 and a fourth light source 210. The polygon mirror 206 of FIG. 4 is identical to the polygon mirror 102 of FIGS. 1, 2 and 3 with each facet 212 having a first upper facet surface 214 of a first tilt angle and a second lower facet surface 216 of a second tilt angle, different from the first tilt angle.

The first light source 202, such as a laser diode, emits a first modulated coherent light beam 218 of a single wavelength. The first light beam 218 is modulated in conformance with the information contained in the video signal sent from the image output control circuit 220 to the first light source 202.

The second light source 204, such as a laser diode, emits a second modulated coherent light beam 222 of a single wavelength. The second light beam 222 is modulated in conformance with the information contained in the video signal sent from the image output control circuit 220 to the second light source 204.

The first modulated light beam 218 and the second modulated light beam 222 are collimated by a collimating lens 224 and then are focused a cylindrical lens 226 onto the facets 212 of the rotating polygon mirror 206.

The first modulated light beam 218 is reflected from the first upper facet surface 214 of the facet 212 of the rotating polygon mirror 206. The second modulated light beam 222 is reflected from the second lower facet surface 216 of the facet 212 of the rotating polygon mirror 206.

The two beams 218 and 222 then pass through a first f-theta scan lenses 228 (consisting of a negative plano-spherical lens 230 and a positive plano-spherical lens 232) and a first cylindrical lens 234.

A first fold mirror 236 will reflect the first reflected modulated beam 218 from the first f-theta scan lenses 228 and first cylindrical lens 234 to the first motion compensating optical (MCO) element 238, which is a wobble correction mirror in this embodiment. The first motion compensating optical (MCO) element 238 will also focus the first reflected modulated beam 218 onto a scan line 240 on the first photoreceptor 242.

A second fold mirror 244 will reflect the second reflected modulated beam 222 from the first f-theta scan lenses 228 and first cylindrical lens 234 to the second motion compensating optical (MCO) element 246, which is a wobble correction mirror in this embodiment. The second motion compensating optical (MCO) element 246 will also focus the second reflected modulated beam 222 onto a scan line 248 on the second photoreceptor 250.

The third light source 208 and the fourth light source 210 are on the opposite side of the single rotating polygon mirror 206 from the first light source 202 and the second light source 204.

The third light source 208, such as a laser diode, emits a third modulated coherent light beam 252 of a single wavelength. The third light beam 252 is modulated in conformance with the information contained in the video signal sent from the image output control circuit 220 to the third light source 208. The light sources can share the same control circuit or each have different control circuits.

The fourth light source 210, such as a laser diode, emits a fourth modulated coherent light beam 254 of a single wavelength. The fourth light beam 254 is modulated in conformance with the information contained in the video signal sent from the image output control circuit 220 to the fourth light source 204.

The third and fourth light sources will be emitting dual light beams to reflect from the facets of the rotating polygon mirror contemporaneously with the first and second light sources emitting dual light beams to reflect from the facets of the rotating polygon mirror.

The third modulated light beam 252 and the fourth modulated light beam 254 are collimated by a collimating lens 256 and then are focused a cylindrical lens 258 onto the facets 212 of the rotating polygon mirror 206.

The third modulated light beam 252 is reflected from the first upper facet surface 214 of the facet 212 of the rotating polygon mirror 206. The fourth modulated light beam 254 is reflected from the second lower facet surface 216 of the facet 212 of the rotating polygon mirror 206.

The two beams 252 and 254 then pass through a second f-theta scan lenses 260 (consisting of a negative plano-spherical lens 262 and a positive plano-spherical lens 264) and a second cylindrical lens 266.

A third fold mirror 268 will reflect the third reflected modulated beam 252 from the second f-theta scan lenses 260 and third cylindrical lens 266 to the third motion compensating optical (MCO) element 270, which is a wobble correction mirror in this embodiment. The third motion compensating optical (MCO) element 270 will also focus the third reflected modulated beam 252 onto a scan line 272 on the third photoreceptor 274.

A fourth fold mirror 276 will reflect the fourth reflected modulated beam 254 from the second f-theta scan lenses 260 and second cylindrical lens 266 to the fourth motion compensating optical (MCO) element 278, which is a wobble correction mirror in this embodiment. The fourth motion compensating optical (MCO) element 278 will also focus the fourth reflected modulated beam 254 onto a scan line 280 on the fourth photoreceptor 282.

The light sources and corresponding photoreceptors need not be on opposite sides of the single polygon mirror of the raster output scanning system. More than two light sources and corresponding photoreceptors can be used with the single polygon mirror of the raster output scanning system. The only optical requirement for the use of multiple light sources is that the modulated light beams do not strike the same surface area on the same facet at the same time. Accordingly, each of the adjacent facets with different tilt angles can be reflecting light beams from multiple light sources as they rotate.

As in the embodiment of FIG. 3, the reflected light beams of FIG. 4 can have separate f-theta scan lenses if the angular separation is sufficiently large between light beams.

Figure 5:
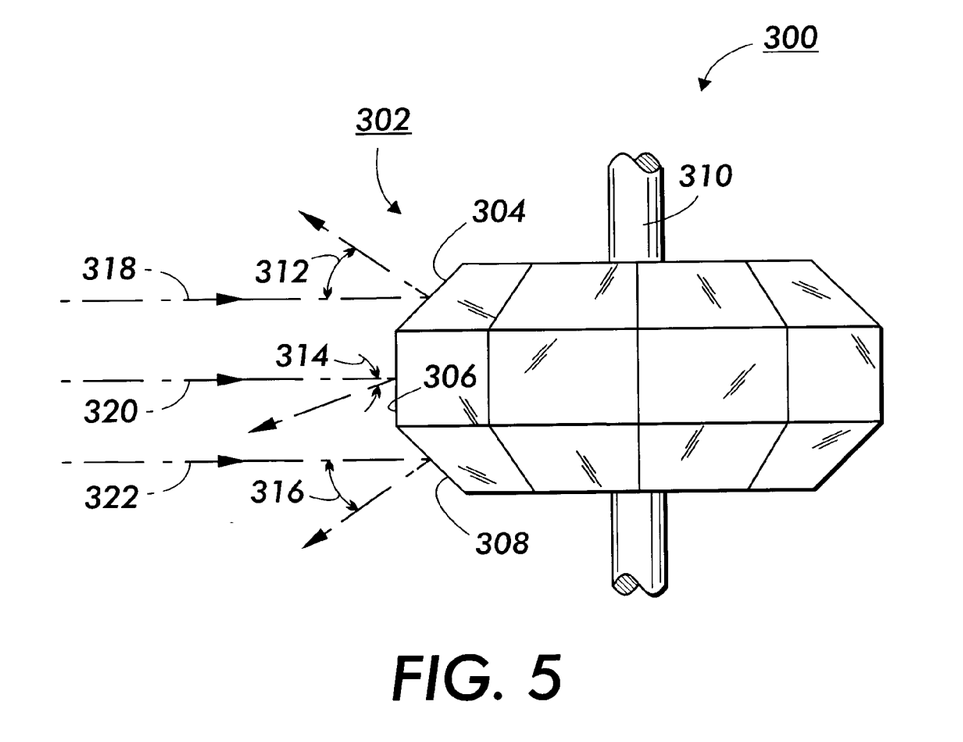
FIG. 5 illustrates a side view of a second embodiment of a rotating polygon mirror with v-shaped facets having three reflective surfaces with different tilt angles.

The embodiment of the rotating polygon mirror 300 of FIG. 5 has a series of facets 302 with three facet surfaces in a frusto-triangular shape or truncated v-shape with an upper first facet surface 304, a middle second facet surface 306 and a lower third facet surface 308. The polygon mirror 300 rotates around an axis of rotation 310.

The upper first facet surface 304 is tilted at a first tilt angle 312 to the axis of rotation 310. The middle second facet surface 306 is at a second parallel tilt angle 314 to the axis of rotation 310. The lower third facet surface 308 is at a third tilt angle 316 to the axis of rotation 310. The tilt angles 312, 314, and 316 are all different. The facet surfaces 304, 306 and 308 are flat mirror surfaces with no optical power. Typical tilt angles would be 0.5 to 5 degrees. The tilt angles 312, 314 and 316 are shown exaggerated in the Figures for ease of understanding.

The first modulated beam 318, the second modulated beam 320 and the third modulated beam 322 are all parallel to each other, closely spaced, and are all perpendicular to the axis of rotation 310.

The first modulated light beam 318 will reflect from the upper first facet surface 304 of the facet 302 of the rotating polygon mirror 300 at the first tilt angle 312. The second modulated light beam 320 will retroreflect from the middle second facet surface 306 of the facet 302 of the rotating polygon mirror 300 at the second parallel tilt angle 314. The third modulated light beam 322 will reflect from the lower third facet surface 308 of the facet 302 of the rotating polygon mirror 300 at the third tilt angle 316.

The light sources, the optical and the photoreceptors of the ROS are not shown for ease of understanding, although they would be equivalent to the prior elements previously discussed in this invention.

Figure 6:
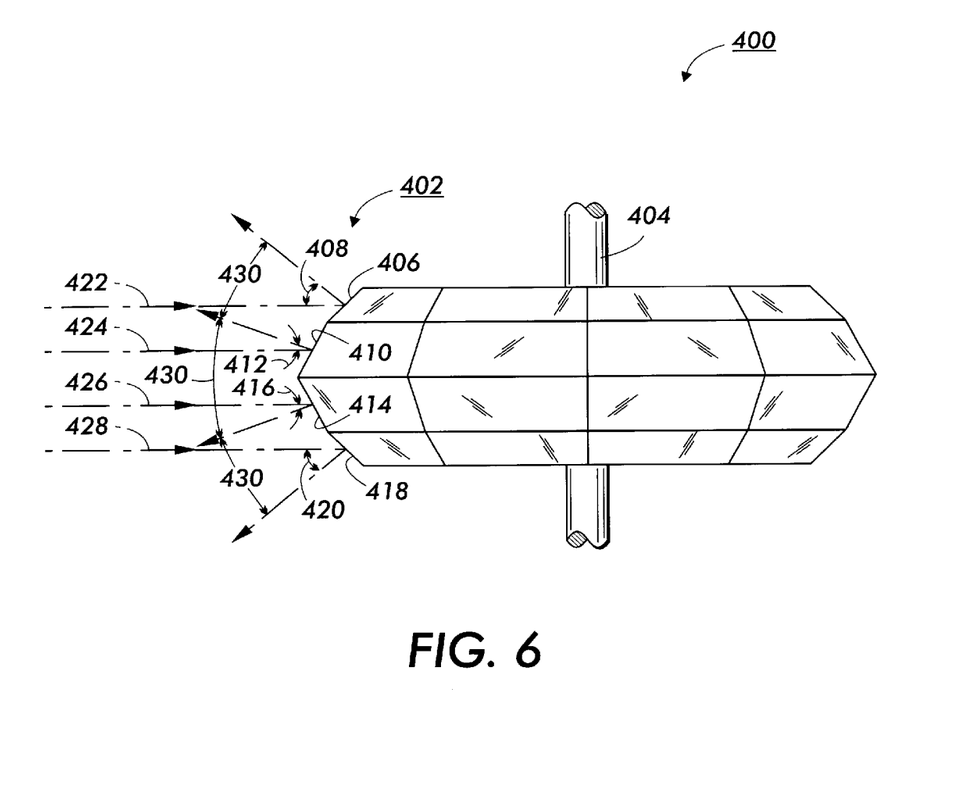
FIG. 6 illustrates a side view of a third embodiment of a rotating polygon mirror with v-shaped face/having four reflective surfaces with different tilt angles.

The rotating polygon mirror 400 of FIG. 6 has a facet 402 with four adjacent facet surfaces in a staggered v-shape with each facet surface having a different tilt angle relative to the axis of rotation 404 of the mirror.

The facet 402 of the polygon mirror 400 has a first upper facet surface 406 at a first tilt angle 408, a second middle upper facet surface 410 at a second tilt angle 412, a third middle lower facet surface 414 at a third tilt angle 416 and a fourth lower facet surface 418 at a fourth tilt angle 420. The tilt angles 408, 412, 416 and 420 are all different. The facet surfaces 406, 410, 414 and 418 are flat mirror surfaces with no optical power. Typical tilt angles would be 0.5 to 5 degrees. The tilt angles 408, 412, 416 and 420 are shown exaggerated in the Figures for ease of understanding.

The first modulated beam 422, the second modulated beam 424, the third modulated beam 426 and the fourth modulated beam 428 are all parallel to each other and are all perpendicular to the axis of rotation 404.

The first modulated light beam 422 will reflect from the first facet surface 406 at the first tilt angle 408. The second modulated light beam 424 will reflect from the second facet surface 410 at the second tilt angle 412.

The third modulated light beam 426 will reflect from the third facet surface 414 at the third tilt angle 416. The fourth modulated light beam 428 will reflect from the fourth facet surface 418 at the fourth tilt angle 420.

The facet surfaces 406, 410, 414 and 418 on the facets 402 of the rotating polygon mirror 400 reflect the modulated light beams 422, 424, 426 and 428. Adjacent reflected modulated light beams 422 and 424 or 424 and 426 or 426 and 428 will have an angular separation 430 of 1 to 10 degrees equivalent to the combination of the tilt angles.

Figure 7:
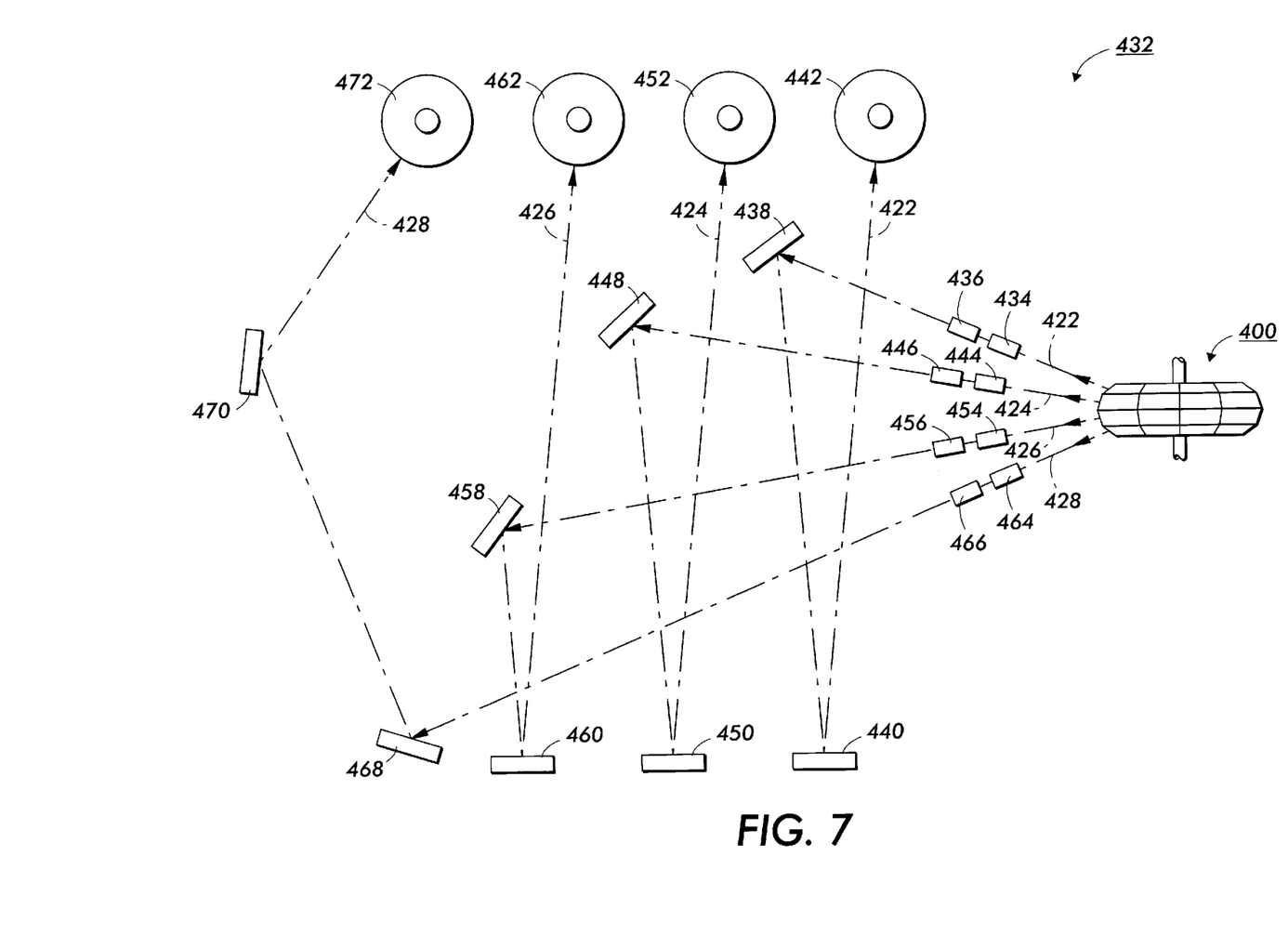
FIG. 7 illustrates a side view of an alternate embodiment of the raster output scanning (ROS) system with the rotating polygon mirror of FIG. 6 with v-shaped facets having four reflective surfaces with different tilt angles to reflect and direct four beams to four different photoreceptors.

As can be seen in the simplified FIG. 7, the raster output scanning (ROS) system 432 has the first upper facet surface 406 of the rotating polygon mirror 400 of FIG. 6 reflect the first modulated light beam 422 through the first f-theta scan lenses 434 and first cylindrical lens 436 to a first fold mirror 438 where it is reflected to a first MCO element 440, a wobble correction mirror. The MCO element 440 will reflect and focus the beam 422 to a scan line on the first photoreceptor 442.

The second middle upper facet surface 410 of the rotating polygon mirror 400 will reflect the second reflected modulated beam 424 through the second f-theta scan lenses 444 and second cylindrical lens 446 to a second fold mirror 448 where it is reflected to a second MCO element 450, a wobble correction mirror. The MCO element 450 will reflect and focus the beam 424 to a scan line on the second photoreceptor 452.

The third middle lower facet surface 414 of the rotating polygon mirror 400 will reflect the third reflected modulated beam 426 through the third f-theta scan lenses 454 and third cylindrical lens 456 to a third fold mirror 458 where it is reflected to a third MCO element 460, a wobble correction mirror. The MCO element 460 will reflect and focus the beam 326 to a scan line on the third photoreceptor 462.

The fourth lower facet surface 418 of the rotating polygon mirror 400 will reflect the fourth reflected modulated beam 428 through the fourth f-theta scan lenses 464 and cylindrical lens fourth 466 to a fourth fold mirror 468 where it is reflected to a second MCO element 470, a wobble correction mirror. The MCO element 470 will reflect and focus the beam 428 to a scan line on the fourth photoreceptor 472.

The light sources and some of the optical elements are not shown for ease of understanding, although they would be equivalent to the prior elements previously discussed in this invention.

Since the polygon mirror has four different tilt angled facets and a single light source, as shown in FIG. 7, the photoreceptors will be on the same side of the polygon mirror as the light source (not shown).

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A dual beam raster output scanning system comprising
a light source emitting a first light beam that is modulated in accordance with an input video data signal and a second light beam that is modulated in accordance with an input video data signal, a first photoreceptor and a second photoreceptor, and a rotating polygon mirror having a plurality of facets, each facet having an upper facet surface having a first tilt angle relative to the axis of rotation of said rotating polygon mirror and a lower facet surface having a second tilt angle relative to the axis of rotation of said rotating polygon mirror, said second tilt angle being different from said first tilt angle, said upper facet surface reflecting said first modulated light beam to scan across a line on said first photoreceptor, and said lower facet surface reflecting said second modulated light beam to scan across a line on said second photoreceptor.

2. The raster output scanning of claim 1 further comprising a f-theta scan lens for focusing said first modulated light beam from said upper facet surfaces of said facets of said rotating polygon mirror onto said first photoreceptor and for focusing said second modulated light beam from said lower facet surfaces of said facets of said rotating polygon mirror onto second first photoreceptor.

3. The raster output scanning system of claim 2 further comprising a first fold mirror for directing said first modulated light beam from said f-theta scan lens to said first photoreceptor and a second fold mirror for directing said second modulated light beam from said f-theta scan lens to said second photoreceptor.

4. The raster output scanning of claim 1 further comprising a first f-theta scan lens for focusing said first modulated light beam from said upper facet surfaces of said facets of said rotating polygon mirror onto said first photoreceptor and a second f-theta scan lens for focusing said second modulated light beam from said lower facet surfaces of said facets of said rotating polygon mirror onto second first photoreceptor.

5. The raster output scanning system of claim 4 further comprising a first fold mirror for directing said modulated light beam from said first f-theta scan lens to said first photoreceptor and a second fold mirror for directing said modulated light beam from said second f-theta scan lens to said second photoreceptor.

6. The raster output scanning system of claim 1 further comprising a collimating lens for collimating said first modulated beam and said second modulated beam and a cylindrical lens for focusing said first modulated beam and said second modulated beam onto said facets of said rotating polygon mirror.

7. A raster output scanning system comprising
a first light source emitting a first light beam that is modulated in accordance with an input video data signal and a second light beam that is modulated in accordance with an input video data signal, a second light source a light source emitting a third light beam that is modulated in accordance with an input video data signal and a fourth light beam that is modulated in accordance with an input video data signal, a first photoreceptor and a second photoreceptor, a third photoreceptor and a fourth photoreceptor, and a rotating polygon mirror having a plurality of facets, each facet having an upper facet surface having a first tilt angle relative to the axis of rotation of said rotating polygon mirror and a lower facet surface having a second tilt angle relative to the axis of rotation of said rotating polygon mirror, said second tilt angle being different from said first tilt angle, said upper facet surface reflecting said first modulated light beam to scan across a line on said first photoreceptor, said lower facet surface reflecting said second modulated light beam to scan across a line on said second photoreceptor contemporaneously with said upper facet surface reflecting said third modulated light beam to scan across a line on said third photoreceptor, and said lower facet surface reflecting said fourth modulated light beam to scan across a line on said fourth photoreceptor.

8. The raster output scanning of claim 7 further comprising a first f-theta scan lens for focusing said first modulated light beam from said upper facet surfaces of said facets of said rotating polygon mirror onto said first photoreceptor and for focusing said second modulated light beam from said lower facet surfaces of said facets of said rotating polygon mirror onto second first photoreceptor and a second f-theta scan lens for focusing said third modulated light beam from said upper facet surfaces of said facets of said rotating polygon mirror onto said third photoreceptor and for focusing said fourth modulated light beam from said lower facet surfaces of said facets of said rotating polygon mirror onto fourth first photoreceptor.

9. The raster output scanning system of claim 8 further comprising a first fold mirror for directing said first modulated light beam from said first f-theta scan lens to said first photoreceptor, a second fold mirror for directing said second modulated light beam from said first f-theta scan lens to said second photoreceptor, a third fold mirror for directing said third modulated light beam from said second f-theta scan lens to said third photoreceptor, a fourth fold mirror for directing said fourth modulated light beam from said second f-theta scan lens to said fourth photoreceptor.

10. The raster output scanning of claim 7 further comprising a first f-theta scan lens for focusing said first modulated light beam from said upper facet surfaces of said facets of said rotating polygon mirror onto said first photoreceptor, a second f-theta scan lens for focusing said second modulated light beam from said lower facet surfaces of said facets of said rotating polygon mirror onto said second photoreceptor, a third f-theta scan lens for focusing said third modulated light beam from said upper facet surfaces of said facets of said rotating polygon mirror onto said third photoreceptor and a fourth f-theta scan lens for focusing said fourth modulated light beam from said lower facet surfaces of said facets of said rotating polygon mirror onto fourth first photoreceptor.

11. The raster output scanning system of claim 10 further comprising a first fold mirror for directing said first modulated light beam from said first f-theta scan lens to said first photoreceptor, a second fold mirror for directing said second modulated light beam from said second f-theta scan lens to said second photoreceptor, a third fold mirror for directing said third modulated light beam from said third f-theta scan lens to said third photoreceptor, a fourth fold mirror for directing said fourth modulated light beam from said fourth f-theta scan lens to said fourth photoreceptor.

12. The raster output scanning system of claim 7 further comprising a first collimating lens for collimating said first modulated beam and said second modulated beam, a first cylindrical lens for focusing said first modulated beam and said second modulated beam onto said facets of said rotating polygon mirror, a second collimating lens for collimating said third modulated beam and said fourth modulated beam, a second cylindrical lens for focusing said third modulated beam and said fourth modulated beam onto said facets of said rotating polygon mirror.

13. A multiple beam raster output scanning system comprising a light source emitting a first light beam that is modulated in accordance with an input video data signal, a second light beam that is modulated in accordance with an input video data signal, and a third light beam that is modulated in accordance with an input video data signal, a first photoreceptor, a second photoreceptor, and a third photoreceptor, and a rotating polygon mirror having a plurality of facets, each facet having an upper facet surface having a first tilt angle relative to the axis of rotation of said rotating polygon mirror, a middle facet surface having a second tilt angle relative to the axis of rotation of said polygon mirror, and a lower facet surface having a third tilt angle relative to the axis of rotation of said rotating polygon mirror, said first tilt angle, said second tilt angle and said third tilt angle being different from each other, said upper facet surface reflecting said first modulated light beam to scan across a line on said first photoreceptor, said middle facet surface reflecting said second modulated light beam to scan across a line on said second photoreceptor, and said lower facet surface reflecting said third modulated light beam to scan across a line on said third photoreceptor.

14. The raster output scanning of claim 13 further comprising a first f-theta scan lens for focusing said first modulated light beam from said upper facet surfaces of said facets of said rotating polygon mirror onto said first photoreceptor, a second f-theta scan lens for focusing said second modulated light beam from said middle facet surfaces of said facets of said rotating polygon mirror onto said second photoreceptor, and a third f-theta scan lens for focusing said third modulated light beam from said lower facet surfaces of said facets of said rotating polygon mirror onto said third photoreceptor.

15. The raster output scanning system of claim 14 further comprising a first fold mirror for directing said first modulated light beam from said first f-theta scan lens to said first photoreceptor, a second fold mirror for directing said second modulated light beam from said second f-theta scan lens to said second photoreceptor, and a third fold mirror for directing said third modulated light beam from said third f-theta scan lens to said third photoreceptor.

16. The raster output scanning system of claim 13 further comprising a collimating lens for collimating said first modulated beam, said second modulated beam and said third modulated beam, and a cylindrical lens for focusing said first modulated beam, said second modulated beam and said third modulated beam onto said facets of said rotating polygon mirror.

17. A multiple beam raster output scanning system comprising a light source emitting a first light beam that is modulated in accordance with an input video data signal, a second light beam that is modulated in accordance with an input video data signal, a third light beam that is modulated in accordance with an input video data signal, and a fourth light beam that is modulated in accordance with an input video data signal, a first photoreceptor, a second photoreceptor, a third photoreceptor, and a fourth photoreceptor, and a rotating polygon mirror having a plurality of facets, each facet having an upper facet surface having a first tilt angle relative to the axis of rotation of said rotating polygon mirror, a middle upper facet surface having a second tilt angle relative to the axis of rotation of said polygon mirror, a middle lower facet surface having a third tilt angle relative to the axis of rotation of said polygon mirror, and a lower facet surface having a fourth tilt angle relative to the axis of rotation of said rotating polygon mirror, said first tilt angle, said second tilt angle, said third tilt angle and said fourth tilt angle being different from each other, said upper facet surface reflecting said first modulated light beam to scan across a line on said first photoreceptor, said middle upper facet surface reflecting said second modulated light beam to scan across a line on said second photoreceptor, said middle lower facet surface reflecting said third modulated light beam to scan across a line on said third photoreceptor, and said lower facet surface reflecting said fourth modulated light beam to scan across a line on said fourth photoreceptor.

18. The raster output scanning of claim 17 further comprising a first f-theta scan lens for focusing said first modulated light beam from said upper facet surfaces of said facets of said rotating polygon mirror onto said first photoreceptor, a second f-theta scan lens for focusing said second modulated light beam from said middle upper facet surfaces of said facets of said rotating polygon mirror onto said second photoreceptor, a third f-theta scan lens for focusing said third modulated light beam from said middle lower facet surfaces of said facets of said rotating polygon mirror onto said third photoreceptor, and a fourth f-theta scan lens for focusing said fourth modulated light beam from said lower facet surfaces of said facets of said rotating polygon mirror onto said fourth photoreceptor.

19. The raster output scanning system of claim 18 further comprising a first fold mirror for directing said first modulated light beam from said first f-theta scan lens to said first photoreceptor, a second fold mirror for directing said second modulated light beam from said second f-theta scan lens to said second photoreceptor, a third fold mirror for directing said third modulated light beam from said third f-theta scan lens to said third photoreceptor, a fourth fold mirror for directing said fourth modulated light beam from said fourth f-theta scan lens to said fourth photoreceptor.

20. The raster output scanning system of claim 17 further comprising a collimating lens for collimating said first modulated beam, said second modulated beam, said third modulated beam, and said fourth modulated beam, and a cylindrical lens for focusing said first modulated beam, said second modulated beam, said third modulated beam and said fourth modulated beam onto said facets of said rotating polygon mirror.

* * * * *